Oct. 6, 1953  B. BARÉNYI  2,654,597
LEAF SPRING FOR MOTOR VEHICLES
Filed Jan. 6, 1950

INVENTOR
BÉLA BARÉNYI
By:
Haseltine, Lake & Co.
AGENTS

Patented Oct. 6, 1953

2,654,597

UNITED STATES PATENT OFFICE 2,654,597

LEAF SPRING FOR MOTOR VEHICLES

Béla Barényi, Stuttgart-Rohr, Germany

Application January 6, 1950, Serial No. 137,059
In Germany January 8, 1949

3 Claims. (Cl. 267—47)

The invention relates to a springing for vehicles, particularly for motor vehicles. The hitherto usual leaf springs have the disadvantage that they are weakened at their mountings or fastenings by bores, grooves, or the like and thereby exposed to failure and breakage, particularly when subjected to such severe stresses as occur in motor vehicles. A further disadvantage of existing leaf spring arrangements is the relatively great friction occurring between the individual leaves which prevents the instantaneous reaction of the spring to minor shocks and forces. Owing to this, the use of leaf springs for the springing of motor vehicles has diminished at an ever increasing rate, and such springs have been replaced by coil or helical springs, or other frictionless springs.

An object of the present invention is to overcome the hitherto usual disadvantages of the leaf spring and to endow it to a considerable extent with the same advantages as frictionless springs. Accordingly, important constructional features of the spring, manufactured in conformity with the invention, consist in that the spring widens out toward its central mounting portion, and is secured against displacement by means of mounting or supporting members embracing the outwardly projecting lateral edges or surfaces of the leaf spring. The leaf spring embodying the present invention preferably has the configuration of a rhombus in plan-form with the central mounting portion thereof being embraced wedge-like at its angular converging lateral edges or surfaces by the mounting or supporting members. As a necessary result of this any weakening and likewise any notching of the leaf spring is obviated, since the clamping forces engage the spring at its unweakened cross-section. In order to diminish or entirely avoid the friction between the leaves, the spring is preferably formed as a single-leaf spring so that friction caused by sliding leaf plates is eliminated. Since the cross-section of the spring is gradually increased in width toward the mounting place, the bending moments occurring in the different cross-sections can be accommodated. The spring may in this case also be formed so that the stresses are equal throughout the length thereof.

In the accompanying drawing one embodiment of the invention and its application to a motor vehicle is illustrated, in which.

Figure 1:
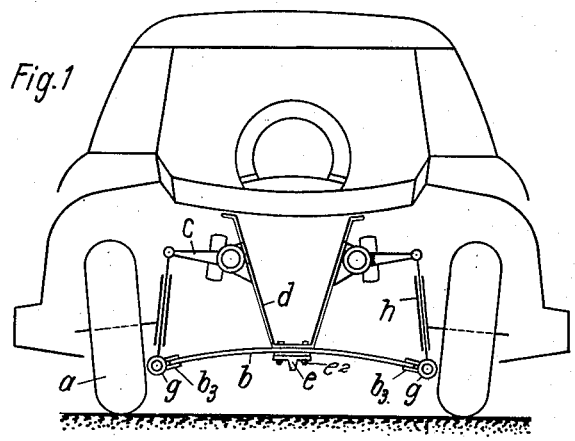
Fig. 1 is a front view of a wheel suspension, for example, of the front wheels of a motor vehicle.
Figure 2:
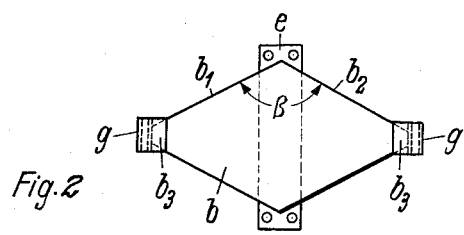
Fig. 2 is a top view of the transverse spring used in the wheel suspension of Fig. 1.
Figure 3:
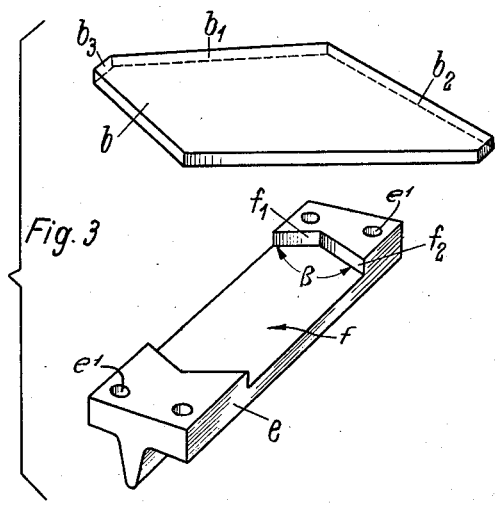
Fig. 3 is an exploded perspective representation of the mounting or supporting body and the leaf spring.

Referring to the drawing in detail, and initially to Fig. 1 thereof, a motor vehicle is there illustrated which includes wheels $a$ supported at the opposite sides of a chassis or frame $d$ by a wheel suspension embodying the present invention. Each wheel $a$ is rotatably carried by a wheel support arm $h$ connected at its upper end to an upper steering arm $c$, extending from the related side of the frame $d$ and also adapted to actuate an associated shock absorber (not shown), and each wheel support arm $h$ is connected at its lower end to the adjacent end of a leaf spring $b$ extending transversely and mounted at its center on the frame $d$ in the manner hereinafter described in detail. Thus, the wheels $a$ at the opposite sides of the vehicle are maintained in substantially parallel relationship.

The leaf spring $b$ consists of one single leaf and has the form of a rhombus, whose lateral edges $b_1$ and $b_2$ converge at an angle $\beta$. At its widest point, the spring rests in a mount or support $e$. The support $e$ is provided with a recess $f$, approximately conforming to the thickness of the spring plate, and defined by shoulders $f_1$ and $f_2$ at the opposite ends of the support which likewise form an angle $\beta$ in such a manner that the spring closely fits into the recess and is held wedge-like by the shoulders $f_1$ and $f_2$ and secured against lateral displacement relative to the support $e$. The support $e$ is formed with holes $e_1$ adjacent the opposite ends and remote from the recess $f$ through which bolts $e_2$ are passed to secure the support $e$ to the underside of the frame $d$. Thus, when the support $e$ is bolted to the underside of the frame $d$, the latter prevents the upward removal of the spring $b$ from the recess $f$.

The ends $b_3$ of the leaf spring may be secured to the linkage members $g$ which connect it to the wheel support arm $h$ or steering knuckle of the wheel, or, by way of example, turned into spring eyes and connected to the linkage members or steering knuckles, or the like, by cross-bolts.

In the embodiment illustrated herein, the leaf spring $b$ serves as means for holding the front wheels in position, so that it has the function of absorbing the driving and braking forces occurring on the wheels and transmitting them to the frame. The rhombus-like form of the spring renders the same especially suitable for absorbing the forces. The spring, of course, may also be used at points where it has no other function except that of springing the vehicle. It may also serve for the springing of any kind of axle construction, for example, oscillating axle shafts, fixed axles, or in combination with other wheel suspensions. It also may be arranged in longitudinal direction of the vehicle.

It will be obvious that the details of construction may be varied from those shown in the drawing. I therefore do not limit myself to such details.

What I claim is:

1. A vehicle suspension comprising: a leaf spring having a widened central zone and lateral edges converging V-like toward one another, a supporting member for said leaf spring on the suspended part of the vehicle, said supporting member having a recess conforming to the shape of the widened central zone of said leaf spring whereby the leaf spring, when inserted with its widened central zone in said recess, is secured against displacement in its plane, and a connecting member fastened to said supporting member and securing said leaf spring against vertical movement perpendicular to the plane of said leaf spring.

2. A vehicle suspension comprising: two vehicle wheels located opposite to each other on different sides of the vehicle, wheel guiding means connected to the suspended part of the vehicle and a leaf spring arranged transversely and mounted on said suspended part for the mutual springing of said vehicle wheels relatively to said suspended part, said leaf spring having a widened central zone and lateral edges converging V-like toward one another, a supporting member for said leaf spring on the suspended part of the vehicle, said supporting member having a recess conforming to the shape of the widened central zone of said leaf spring whereby the leaf spring, when inserted with its widened zone in said recess, is secured against displacement in its plane, and a connecting member fastened to said supporting member and securing said leaf spring against vertical movement perpendicular to the plane of said leaf spring.

3. A vehicle suspension according to claim 2 wherein said leaf spring consists of a single spring plate having a substantially rhomboidal plan shape and a uniform thickness throughout the whole length thereof.

BÉLA BARÉNYI.

References Cited in the file of this patent

UNITED STATES PATENTS

| Number | Name | Date |
|---|---|---|
| 291,814 | Timmis | Jan. 8, 1884 |
| 1,380,523 | Brock | June 7, 1921 |
| 1,450,378 | Kelly | Apr. 3, 1923 |
| 1,520,484 | Shore | Dec. 23, 1924 |
| 2,049,555 | Zaparka | Aug. 4, 1936 |
| 2,155,073 | Ziska | Apr. 18, 1939 |
| 2,171,469 | Boxan | Aug. 29, 1939 |
| 2,211,647 | Collier | Aug. 13, 1940 |
| 2,505,733 | Famighetti | Apr. 25, 1950 |
| 2,533,511 | Rowland et al. | Dec. 12, 1950 |